(12) United States Patent
Zamer

(10) Patent No.: US 10,095,987 B2
(45) Date of Patent: Oct. 9, 2018

(54) INTEGRATING EVENT-PLANNING SERVICES INTO A PAYMENT SYSTEM

(71) Applicant: Kamal Zamer, Austin, TX (US)

(72) Inventor: Kamal Zamer, Austin, TX (US)

(73) Assignee: eBay Inc., San Jose, CA (US)

( * ) Notice: Subject to any disclaimer, the term of this patent is extended or adjusted under 35 U.S.C. 154(b) by 1203 days.

(21) Appl. No.: 14/262,297

(22) Filed: Apr. 25, 2014

(65) Prior Publication Data

US 2015/0310355 A1 Oct. 29, 2015

(51) Int. Cl.
*G06Q 10/02* (2012.01)
*G06Q 40/00* (2012.01)

(52) U.S. Cl.
CPC .......... *G06Q 10/02* (2013.01); *G06Q 40/12* (2013.12)

(58) Field of Classification Search
CPC .................................. G06Q 10/02; G06Q 40/12
See application file for complete search history.

(56) References Cited

U.S. PATENT DOCUMENTS

| | | | |
|---|---|---|---|
| 5,634,016 A | 5/1997 | Steadham et al. | |
| 7,277,572 B2 | 10/2007 | Macinnes et al. | |
| 7,822,628 B2 * | 10/2010 | Brady | G06Q 10/0631 |
| | | | 705/7.13 |
| 8,893,226 B1 * | 11/2014 | DeRosia | G06F 21/33 |
| | | | 709/229 |
| 2002/0016729 A1 * | 2/2002 | Breitenbach | G06Q 10/06 |
| | | | 707/802 |
| 2002/0165731 A1 * | 11/2002 | Dempsey | G01S 5/02 |
| | | | 705/1.1 |
| 2003/0156135 A1 * | 8/2003 | Lucarelli | G06Q 30/02 |
| | | | 715/757 |
| 2005/0071186 A1 * | 3/2005 | Manzo | G06Q 20/202 |
| | | | 705/21 |
| 2005/0121422 A1 | 6/2005 | Morden et al. | |
| 2008/0092059 A1 * | 4/2008 | White | G06Q 10/06 |
| | | | 715/747 |
| 2008/0120150 A1 * | 5/2008 | McSheffrey | G06Q 10/00 |
| | | | 705/7.33 |

(Continued)

FOREIGN PATENT DOCUMENTS

CN 102590923 A 7/2012

OTHER PUBLICATIONS

"3D Event Designer", published on Aug. 27, 2013 by www.3deventdesigner.com (Year: 2013).*

(Continued)

*Primary Examiner* — Kevin H Flynn
*Assistant Examiner* — Omar Zeroual
(74) *Attorney, Agent, or Firm* — Schwegman Lundberg & Woessner, P.A.

(57) ABSTRACT

A method of managing events is disclosed. It is determined that a user is present at a particular location within an event venue. It is determined that the user has reserved the event venue for a particular time period. A selection is received from the user of a particular merchant that is committed to providing services at the event during the particular time period. The particular location within the event is associated with the particular merchant. A notification of the association of the particular location within the event venue with the particular merchant is generated for communication to the particular merchant.

15 Claims, 8 Drawing Sheets

(56) References Cited

U.S. PATENT DOCUMENTS

| | | | | |
|---|---|---|---|---|
| 2008/0201196 | A1* | 8/2008 | Rowland | G06Q 10/06311 705/7.13 |
| 2009/0009593 | A1 | 1/2009 | Cameron et al. | |
| 2009/0144143 | A1 | 6/2009 | Iyer | |
| 2009/0265246 | A1* | 10/2009 | Nelson | G06Q 10/06 705/14.73 |
| 2010/0250707 | A1* | 9/2010 | Dalley | G06Q 10/10 709/219 |
| 2010/0268513 | A1* | 10/2010 | Loberg | G06F 17/5004 703/1 |
| 2011/0301760 | A1* | 12/2011 | Shuster | G06T 17/00 700/264 |
| 2012/0158540 | A1* | 6/2012 | Ganti | G06Q 30/0185 705/26.35 |
| 2013/0024785 | A1* | 1/2013 | Van Wie | G06F 3/04815 715/753 |
| 2013/0054293 | A1* | 2/2013 | Sen | G06Q 10/10 705/7.18 |
| 2013/0190039 | A1* | 7/2013 | Lee | G06Q 50/12 455/552.1 |
| 2014/0025421 | A1* | 1/2014 | Sen | G06Q 10/06 705/7.23 |
| 2014/0229390 | A1* | 8/2014 | Morris | G06Q 10/103 705/302 |
| 2015/0112738 | A1* | 4/2015 | Marinaro | G06Q 10/02 705/5 |
| 2015/0227856 | A1* | 8/2015 | Hoang-To | G06Q 10/02 705/5 |
| 2015/0268817 | A1* | 9/2015 | Phan | G06Q 10/06 715/838 |

OTHER PUBLICATIONS

"10 Reasons a Room Layout is an Event Planning Essential", [Online]. Retrieved from the Internet: <URL: http://www.advancedstaging.com/blog/bid/362818/10-Reasons-A-Room-Layout-Is-An>, (Dec. 19, 2013), 3 pgs.
"Architectural drawing", [Online]. Retrieved from the Internet: <URL: http://en.wikipedia.org/wiki/Architectural_drawing>, (Feb. 8, 2014), 8 pgs.
"CAD and Rendering", [Online]. Retrieved from the Internet: <URL: http://www.avfx.com/services/cad-and-rendering/E>, (Accessed Feb. 18, 2014), 1 pg.
"CAD Forum—How to project geometry to any 3D surface", [Online]. Retrieved from the Internet: <URL: http://www.cadforum.cz/cadforum_en/how-to-project-geometry-to-any-3d-surface-tip7297>, (Accessed Feb. 18, 2014), 2 pgs.
"Engineering drawing", [Online]. Retrieved from the Internet: <URL: http://en.wikipedia.org/wiki/Engineering_drawing>, (Feb. 3, 2014), 15 pgs.
"Geographically Projecting CAD files—Autodesk Community", [Online]. Retrieved from the Internet: <URL: http://forums.autodesk.com/t5/AutoCAD-2007-2008-2009/Geographically-Projecting-CAD-files/td-p/1830129>, (Accessed Feb. 18, 2014), 3 pgs.
"GIS Manual: Georeferencing Images and CAD Data", [Online]. Retrieved from the Internet: <URL: http://www.gsd.harvard.edu/gis/manual/georeferencing/>, (Accessed Feb. 18, 2014), 4 pgs.
"Graphical projection", [Online]. Retrieved from the Internet: <URL: http://en.wikipedia.org/wiki/Graphical_projection>, (Dec. 16, 2013), 6 pgs.
"HowTo: Define the projection for CAD data for use in ArcMap", [Online]. Retrieved from the Internet: <URL: http://support.esri.com/fr/knowledgebase/techarticles/detail/29035>, (Sep. 20, 2012), 2 pgs.
"Laser Show Resource Guide—Making 3D, floating images—Pangolin Laser Systems", [Online]. Retrieved from the Internet: <URL: http://www.pangolin.com/resguide03b.htm>, (Mar. 10, 2010), 3 pgs.
"Leica Roteo: Versatile rotating lasers", [Online]. Retrieved from the Internet: <URL: http://www.bonnevilleblue.com/images/Leica%201%20(Lasers)/Roteo%20family.pdf>, (2009), 16 pgs.
"Orthographic projection", [Online]. Retrieved from the Internet: <URL: http://en.wikipedia.org/wiki/Orthographic_projection>, (Feb. 18, 2014), 3 pgs.
"Project geometry impossible—Autodesk Community", [Online]. Retrieved from the Internet: <URL: http://forums.autodesk.com/t5/AutoCAD-Civil-3D-General/project-geometry-impossible/td-p/2784376>, (Accessed Feb. 18, 2014), 5 pgs.
"Projecting Geometry to a 3D Surface", [Online]. Retrieved from the Internet: <URL: http://autocadgazette.blogspot.com/2010/08/projecting-geometry-to-3d-surface.html>, (Aug. 17, 2010), 3 pgs.
"Re: project geometry impossible", [Online]. Retrieved from the Internet: <URL: http://forums.autodesk.com/t5/AutoCAD-Civil-3D-General/project-geometry-impossible/m-p/2785344>, (Accessed Feb. 18, 2014), 2 pgs.
"SL Laser—Frequently Asked Questions", [Online]. Retrieved from the Internet: <URL: http://www.reid.com.au/site/DefaultSite/filesystem/files/Tools/Reid%20Laser%20FAQ.pdf>, (Accessed Feb. 18, 2014), 2 pgs.
"Thread: CAD Projection", [Online]. Retrieved from the Internet: <URL: http://forums.arcgis.com/threads/78221-CAD-Projection>, (Accessed Feb. 18, 2014), 3 pgs.
"Vivien: Virtual Event Designer", [Online]. Retrieved from the Internet: <URL: http://www.paintingwithlight.be/Vivien/Vivien%20Brochure.pdf>, (Accessed Feb. 18, 2014), 4 pgs.
Garber, Natasha, "Before the Fact", [Online]. Retrieved from the Internet: <URL: http://specialevents.com/event-tools/fact>, (Aug. 1, 2006), 3 pgs.

* cited by examiner

INTEGRATING EVENT-PLANNING SERVICES INTO A PAYMENT SYSTEM

TECHNICAL FIELD

The present application relates generally to the technical field of implementing payment systems, and, in one specific example, to increasing revenues of an acquiring bank (or acquirer) by offering event-planning services to customers or potential customers of the acquiring bank.

BACKGROUND

The planning of events often includes coordination of the events between various entities, including an event planner, an operator of a venue at which the event will be held, vendors or merchants who are providing services for the event, and attendees of the event. For example, a wedding planner may reserve a venue, such as a banquet hall, for a particular period of time on a particular day. The wedding planner may then coordinate with various vendors, such as a caterer, a florist, disk jockey, a baker, and so on, such that each of the vendors arrive and/or setup up particular things (e.g., tables, food, flowers, speakers, wedding cake, and so on) at particular locations within the venue and at particular times.

BRIEF DESCRIPTION OF THE DRAWINGS

Some embodiments are illustrated by way of example and not limitation in the figures of the accompanying drawings.

DETAILED DESCRIPTION

In the following description, for purposes of explanation, numerous specific details are set forth in order to provide an understanding of various embodiments of the present subject matter. It will be evident, however, to those skilled in the art that various embodiments may be practiced without these specific details.

An event planner may be more likely to use a particular payment system, such as PayPal, to make payments pertaining to an event if the payment service is integrated with event-planning services. For example, consider that a wedding planner has access to an application executing on a mobile device that enables the wedding planner to walk around an event venue and use the application to specify where and when particular vendors, such as caterers, florists, bakers, and so on are to place items within the venue. For example, the event planner points the device at a particular location and uses the application to manipulate a projection of a schematic of an item that is to be placed at the particular location (e.g., a wedding cake, a flower arrangement, a speaker system) to simulate the actual placement of the item in the venue. The event planner then saves the specification for later access by the vendors when they arrive at the venue. The application may be configured to automatically identify particular times and locations based on data obtained from a payment system pertaining to transactions that the wedding planner has engaged in with other parties pertaining to the event, thus simplifying the planning process.

In various embodiments, a method of managing events is disclosed. It is determined that a user is present at a particular location within an event venue. It is determined that the user has reserved the event venue for a particular time period. A selection is received from the user of a particular merchant that is committed to providing services at the event during the particular time period. The particular location within the event is associated with the particular merchant. A notification of the association of the particular location within the event venue with the particular merchant is generated for communication to the particular merchant.

This method and various embodiments disclosed herein may be implemented as a computer system having one or more modules (e.g., hardware modules or software modules). This method and various embodiments disclosed herein may be embodied as instructions stored on a machine-readable medium that, when executed by a processor, cause the processor to perform the method.

Figure 1:
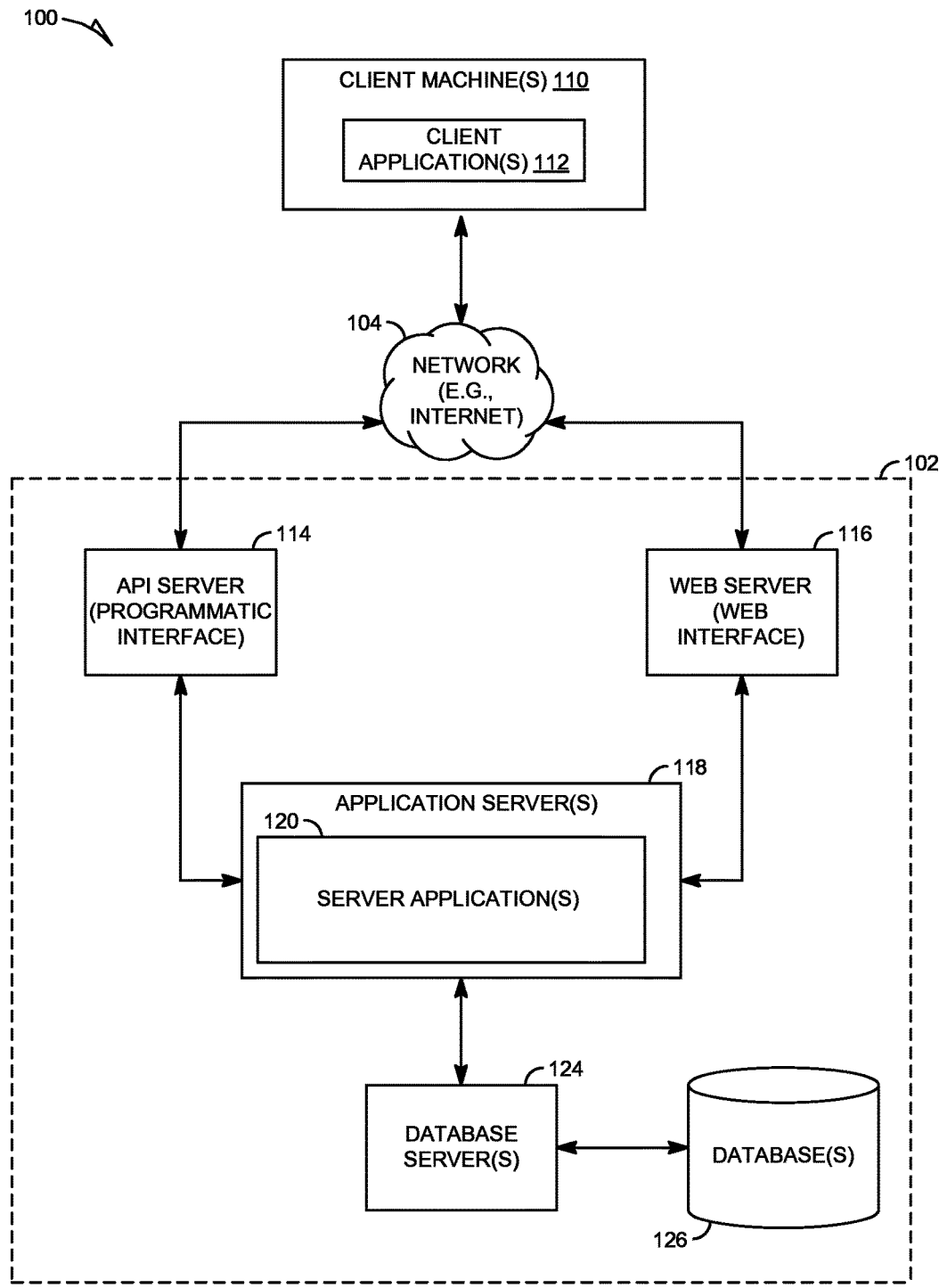
FIG. 1 is a network diagram depicting a client-server system within which various example embodiments may be deployed.

FIG. 1 is a network diagram depicting a system 100 within which various example embodiments may be deployed. A networked system 102, in the example forms of a network-based marketplace or other publication system, provides server-side functionality, via a network 104 (e.g., the Internet or Wide Area Network (WAN)) to one or more clients machines 110. FIG. 1 illustrates client application(s) 112 on the client machines 110. Examples of client application(s) 112 may include a web browser application, such as the Internet Explorer browser developed by Microsoft Corporation of Redmond, Wash. or other application supported by an operating system of the device, such as Windows, iOS or Android operating systems. Each of the client application(s) 112 may include a software application module (e.g., a plug-in, add-in, or macro) that adds a specific service or feature to a larger system.

An API server 114 and a web server 116 are coupled to, and provide programmatic and web interfaces respectively to, one or more application servers 118. The application servers 118 host one or more server application(s) 120. The application servers 118 are, in turn, shown to be coupled to one or more database servers 124 that facilitate access to one or more databases 126 or data stores, such as NoSQL or non-relational data stores.

The applications 120 may provide a number of marketplace functions and services to users that access the networked system 102. While the applications 120 are shown in FIG. 1 to form part of the networked system 102, in alternative embodiments, the various applications 120 may form part of a service that is separate and distinct from the networked system 102.

Further, while the system 100 shown in FIG. 1 employs a client-server architecture, various embodiments are, of course, not limited to such an architecture, and could equally well find application in a distributed, or peer-to-peer, architecture system, for example. The various server applications 120 could also be implemented as standalone software programs, which do not necessarily have networking capabilities. Additionally, although FIG. 1 depicts machines 110 as being coupled to a single networked system 102, it will be readily apparent to one skilled in the art that client machines 110, as well as client applications 112, may be coupled to multiple networked systems, such as payment applications associated with multiple payment processors or acquiring banks (e.g., PayPal, Visa, MasterCard, and American Express).

Web applications executing on the client machine(s) 110 may access the various applications 120 via the web interface supported by the web server 116. Similarly, native applications executing on the client machine(s) 110 may accesses the various services and functions provided by the applications 120 via the programmatic interface provided by the API server 114. An example of one of the client application(s) 112 may be a seller application (e.g., the TurboLister application developed by eBay Inc., of San Jose, Calif.) that enables sellers to author and manage listings on the networked system 102 in an off-line manner, and to perform batch-mode communications between the client application(s) 112 and the networked system 102. Other examples of client application(s) 112 may be third-party applications. For example, the third-party applications may, utilizing information retrieved from the networked system 102, support one or more features or functions on a website hosted by the third party. The third-party website may, for example, provide one or more promotional, marketplace or payment functions that are supported by the relevant applications of the networked system 102.

Figure 2:
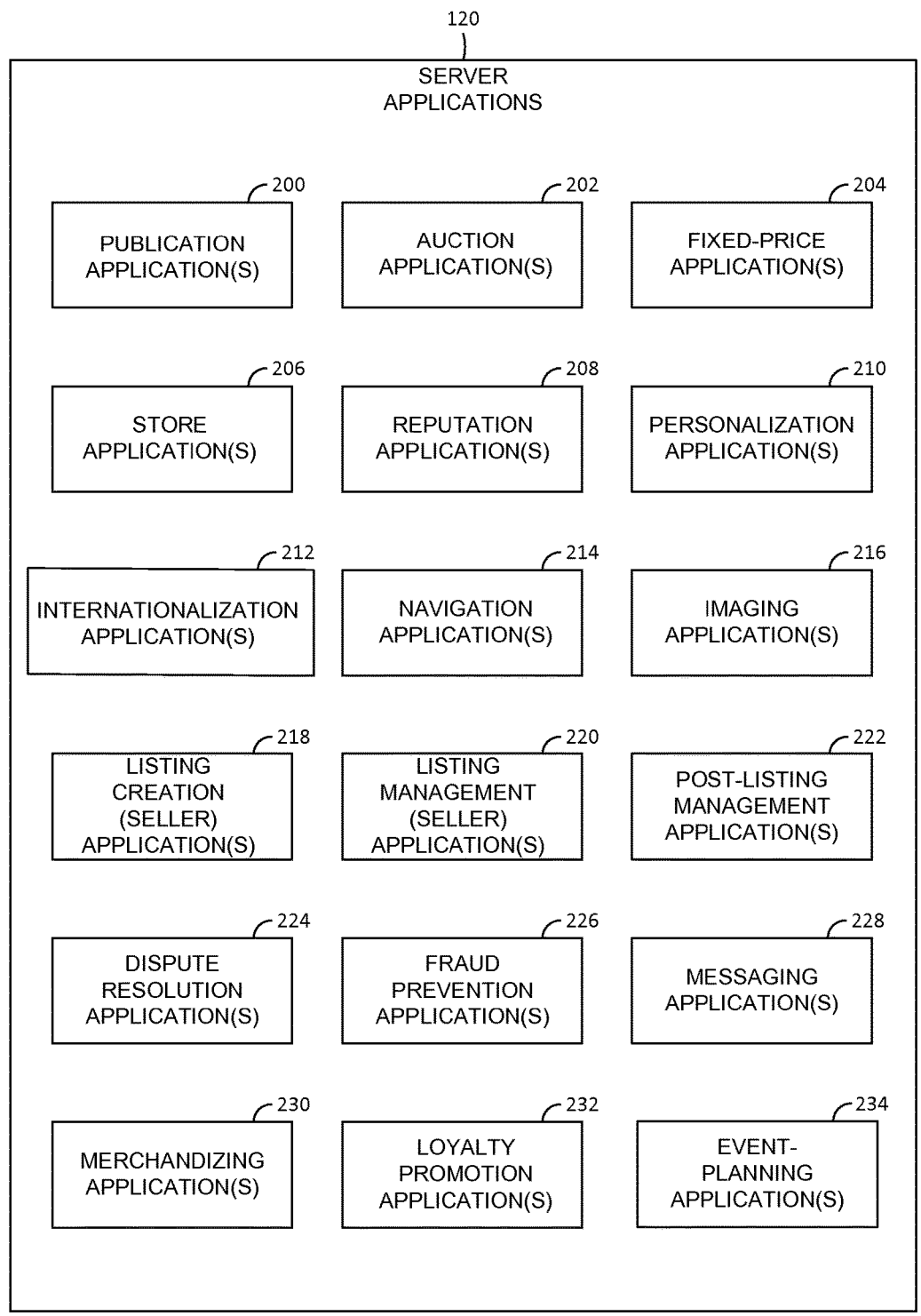
FIG. 2 is a block diagram illustrating multiple applications including best offer applications that, in various example embodiments, are provided as part of the networked system of FIG. 1.

FIG. 2 is a block diagram illustrating multiple server applications 120 that, in various example embodiments, are provided as part of the networked system 102. The server applications 120 may be hosted on dedicated or shared server machines (not shown) that are communicatively coupled to enable communications between server machines. The server applications 120 themselves are communicatively coupled (e.g., via appropriate interfaces) to each other and to various data sources, so as to allow information to be passed between the server applications 120 so as to allow the server applications 120 to share and access common data. The server applications 120 may furthermore access one or more databases 126 via the database servers 124.

The networked system 102 may provide a number of publishing, listing and price-setting mechanisms whereby a seller may list (or publish information concerning) goods or services for sale, a buyer can express interest in or indicate a desire to purchase such goods or services, and a price can be set for a transaction pertaining to the goods or services. To this end, the server applications 120 are shown to include at least one publication application 200 and one or more auction applications 202 which support auction-format listing and price setting mechanisms (e.g., English, Dutch, Vickrey, Chinese, Double, Reverse auctions etc.). The various auction applications 202 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 204 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with auction-format listings, and allow a buyer to purchase goods or services, which are also being offered for sale via an auction, for a fixed-price that is typically higher than the starting price of the auction.

Store applications 206 allow a seller to group listings within a "virtual" store, which may be branded and otherwise personalized by and for the seller. Such a virtual store may also offer promotions, incentives and features that are specific and personalized to a relevant seller.

Reputation applications 208 allow users that transact, utilizing the networked system 102, to establish, build and maintain reputations, which may be made available and published to potential trading partners. Consider that where, for example, the networked system 102 supports person-to-person trading, users may otherwise have no history or other reference information whereby the trustworthiness and credibility of potential trading partners may be assessed. The reputation applications 208 allow a user (e.g., through feedback provided by other transaction partners) to establish a reputation within the networked system 102 over time. Other potential trading partners may then reference such a reputation for the purposes of assessing credibility and trustworthiness.

Personalization applications 210 allow users of the networked system 102 to personalize various aspects of their interactions with the networked system 102. For example a user may, utilizing an appropriate personalization application 210, create a personalized reference page at which information regarding transactions to which the user is (or has been) a party may be viewed. Further, a personalization application 210 may enable a user to personalize listings and other aspects of their interactions with the networked system 102 and other parties.

The networked system 102 may support a number of marketplaces that are customized, for example, for specific geographic regions. For instance, a version of the networked system 102 may be customized for the United Kingdom, whereas another version of the networked system 102 may be customized for the United States. Each of these versions may operate as an independent marketplace, or may be customized (or internationalized) presentations of a common underlying marketplace. The networked system 102 may accordingly include a number of internationalization applications 212 that customize information (and/or the presentation of information) by the networked system 102 according to predetermined criteria (e.g., geographic, demographic or marketplace criteria). For example, the internationalization applications 212 may be used to support the customization of information for a number of regional websites that are operated by the networked system 102 and that are accessible via respective web servers 116.

Navigation of the networked system 102 may be facilitated by one or more navigation applications 214. For example, a search application (as an example of a navigation application) may enable keyword searches of listings published via the networked system 102. A browse application may allow users to browse various category, catalogue, or inventory data structures according to which listings may be classified within the networked system 102. Various other navigation applications may be provided to supplement the search and browsing applications.

In order to make listings available via the networked system 102 as visually informing and attractive as possible, the marketplace applications 120 may include one or more imaging applications 216, which users may utilize to upload images for inclusion within listings. An imaging application 216 also operates to incorporate images within viewed listings. The imaging applications 216 may also support one or more promotional features, such as image galleries that are presented to potential buyers. For example, sellers may pay an additional fee to have an image included within a gallery of images for promoted items.

Listing creation applications 218 allow sellers to conveniently author listings pertaining to goods or services that they wish to transact via the networked system 102, and listing management applications 220 allow sellers to manage such listings. Specifically, where a particular or predetermined seller has authored and/or published a large number of listings, the management of such listings may present a challenge. The listing management applications 220 provide a number of features (e.g., auto-relisting, inventory level monitors, etc.) to assist the seller in managing such listings. The listing creation application 218 and listing management applications 220 may allow sellers to manage listing in bulk (e.g., in a single operation, such as by an uploading of a file) and provide templates for sellers to manage category-specific, vendor-specific, or general-type-specific (e.g., catalog or ticket) listings. One or more post-listing management applications 222 also assist sellers with a number of activities that typically occur post-listing. For example, upon completion of an auction facilitated by one or more auction applications 202, a seller may wish to leave feedback regarding a particular or predetermined buyer. To this end, a post-listing management application 222 may provide an interface to one or more reputation applications 208, so as to allow the seller to conveniently provide feedback regarding multiple buyers to the reputation applications 208.

Dispute resolution applications 224 provide mechanisms whereby disputes arising between transacting parties may be resolved. For example, the dispute resolution applications 224 may provide guided procedures whereby the parties are guided through a number of operations in an attempt to settle a dispute. In the event that the dispute cannot be settled via the guided procedures, the dispute may be escalated to a third-party mediator or arbitrator.

A number of fraud prevention applications 226 implement fraud detection and prevention mechanisms to reduce the occurrence of fraud within the networked system 102.

Messaging applications 228 are responsible for the generation and delivery of messages to users of the networked system 102. These messages may, for example, advise users regarding the status of listings at the networked system 102 (e.g., providing "outbid" notices to bidders during an auction process or providing promotional and merchandising information to users). Respective messaging applications 228 may utilize any one of a number of message delivery networks and platforms to deliver messages to users. For example, messaging applications 228 may deliver electronic mail (e-mail), instant message (IM), Short Message Service (SMS), text, facsimile, or voice (e.g., Voice over IP (VoIP)) messages via the wired (e.g., the Internet), Plain Old Telephone Service (POTS), or wireless (e.g., mobile, cellular, WiFi, WiMAX) networks.

Merchandising applications 230 support various merchandising functions that are made available to sellers to enable sellers to increase sales via the networked system 102. The merchandising applications 230 also operate the various merchandising features that may be invoked by sellers, and may monitor and track the success of merchandising strategies employed by sellers.

The networked system 102 itself, or one or more parties that transact via the networked system 102, may operate loyalty programs that are supported by one or more loyalty/promotion applications 232. For example, a buyer may earn loyalty or promotions points for each transaction established and/or concluded with a particular or predetermined seller, and may be offered a reward for which accumulated loyalty points can be redeemed.

Event-management application(s) 234, described in more detail below, may be used in conjunction with a payment system to help coordinate events that are to be held at a venue.

Figure 3A:
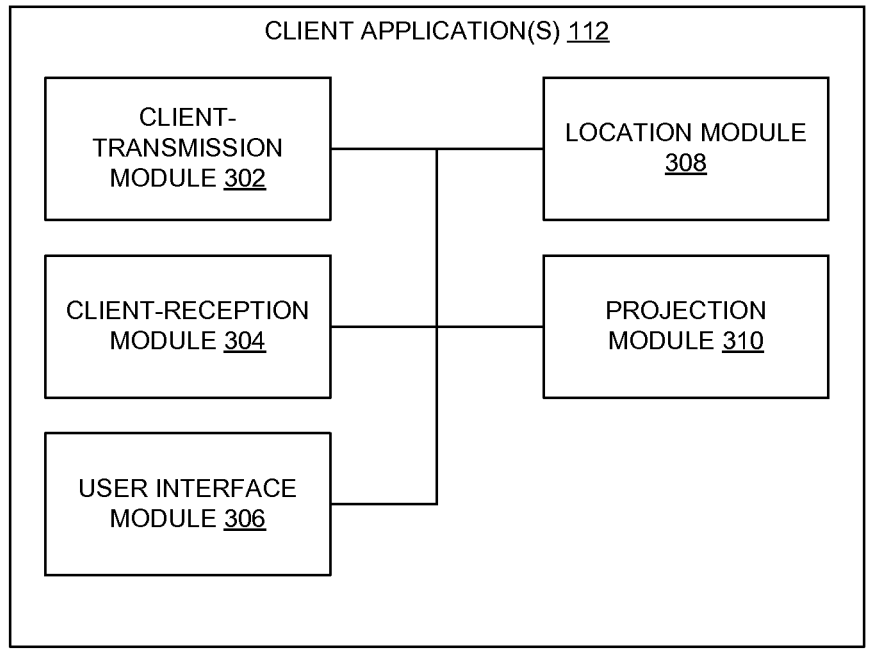
FIG. 3A is a block diagram illustrating example modules of the client application(s) of FIG. 1.

FIG. 3A is a block diagram illustrating example modules of the client application(s) 112. A client transmission module 302 may be configured transmit communications from client application(s) 112 (e.g., to the event-planning application(s) 234). A client-reception module 304 may be configured to receive communications (e.g., from the event-planning application(s) 234). A user interface module 306 may be configured to present one or more user interfaces, such as user interfaces allowing a user to specify a selection of a vendor to associate with a particular or predetermined location at a particular or predetermined time, as will be described in more detail below). A location module 308 may be configured to determine a location of a device of a user (e.g., based on GPS data). A projection module 308 may be configured to project a visual representation of an item onto a surface (e.g., based on a schematic of the item) as well as determine a position or orientation of the item as desired by a planner of an even, as will be described in more detail below.

Figure 3B:
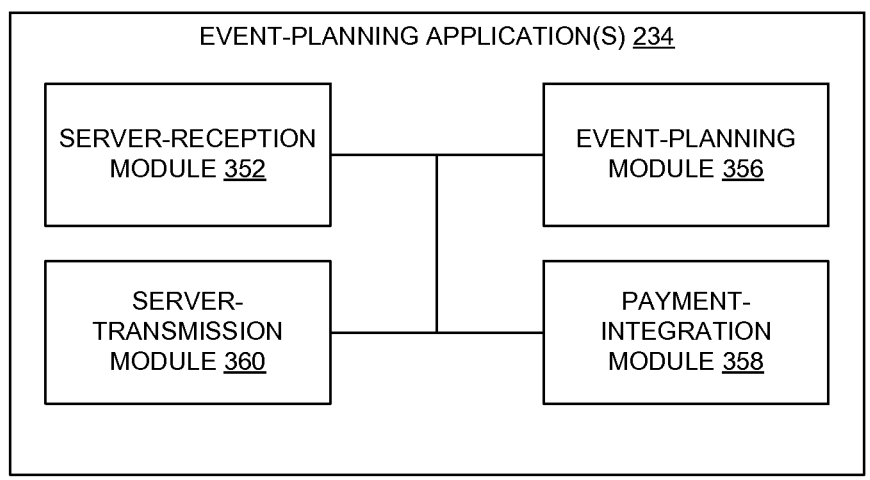
FIG. 3B is a block diagram illustrating example modules of the event-planning application(s) of FIG. 2.

FIG. 3B is a block diagram illustrating example modules of the event-planning application(s) 234. A server-reception module 352 may be configured to receive communications (e.g., from the client application(s) 112). A server-transmission module 360 may be configured to send communications (e.g., to the client application(s) 112). An event-planning module 356 may be configured to maintain data pertaining to an event that an organizer is organizing at a venue. Such data may include data pertaining to vendors that will be providing services at the event, such as locations at which the event planner desires for the vendors to set up equipment or provide services to the event. A payment-integration module 358 may be configured to integrate the event-planning services with a payment processing system (e.g., PayPal). For example, the payment-integration module 358 may be configured to request and receive records corresponding to transactions associated with an event that an event planner is organizing at a venue. Such transactions may include transactions between the event planner to reserve a venue for a particular or predetermined time period, transactions between the event planner and vendors to provide services at the event, and so on.

In various embodiments, various functions of the client application(s) 112 may be provided by the event-planning application(s) 234 of the server application(s) 120 instead of, in addition to, or in combination with the client application(s) 112. For example, item-projection functions may be distributed between the client and server applications.

Figure 4:
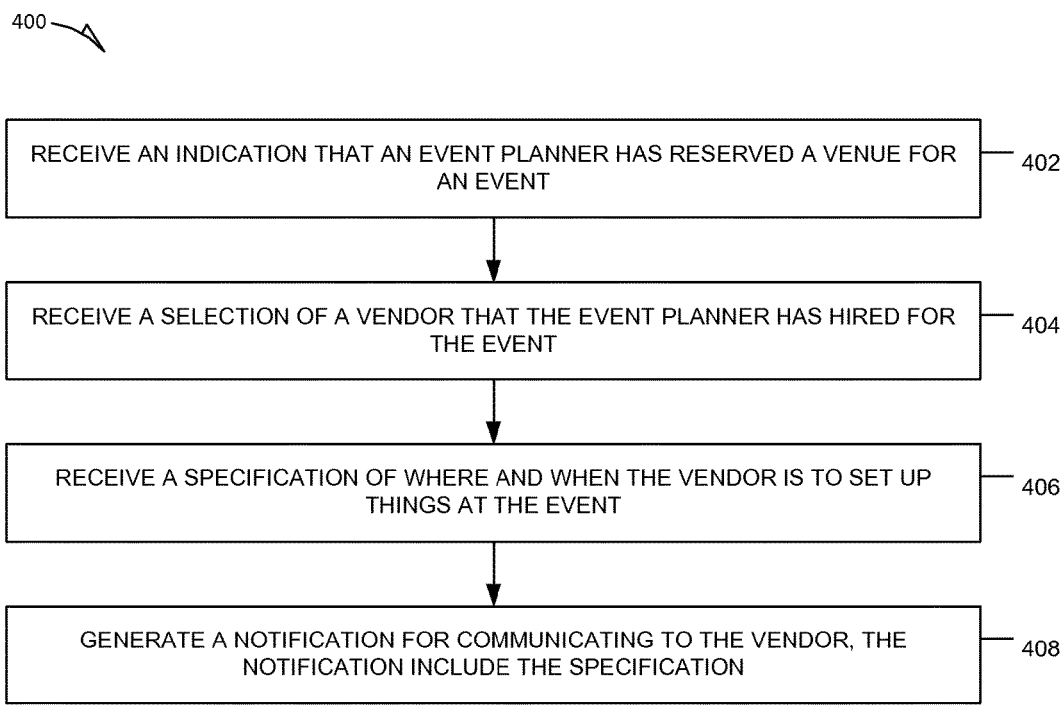
FIG. 4 is a flowchart illustrating example operations of a method 400 of integrating event-planning services into a payment processing systems.

FIG. 4 is a flowchart illustrating example operations of a method 400 of integrating event-planning services into a payment processing systems. In various embodiments, the method 400 may be performed by various modules of the event-planning application(s) 234.

At operation 402, the server-reception module may receive an indication that an event planner has reserved a venue for an event. In various embodiments, the indication may be received in response to a query (e.g., issued by the integration module) issued to a payment processing system. The query may seek payment records maintained by the payment processing system associated with the venue. For example, the integration module may query the payment system for payment records corresponding to transactions between an event planner of the event and an operator of the venue during a particular time period (e.g., on a Saturday, April 12, from 1 to 3 pm). Based on a match being found, the payment system may provide the indication that the event planner has reserved the venue for the event during the particular time period.

At operation 404, the server-reception module may receive a selection of a vendor that the event planner has hired for the event. In various embodiments, the vendors that the event planner has hired for the event may be determined based on a response to a query (e.g., issued by the integration module) to the payment system. The query may seek payment records maintained by the payment processing system corresponding transactions between the event planner and the vendors pertaining to services that are to be performed by the vendors during the identified time period of the event. In various embodiments, the selection of the vendor may be based on an indication that the event planner has interacted with a user interface presented on a device of the event planner to select the vendor from a list of the vendors that the event planner has hired for the time period.

At operation 406, the server-reception module may receive a specification of where and when the vendor is to set up things at the event. In various embodiments, the location may be based on the current location of the event planner within the event venue. For example, the event module may issue a query (via the server-transmission module) to a device of the event planner for the current location of the event planner within the venue. The event module may then determine that the event planner is present at a particular area (e.g., an area reserved for a booth, an area corresponding to a location on a map associated with the venue, such as a dining area, stage, dance floor, reception area, seating area, lobby, and so on). Additionally the event module may receive a set-up time period from the event planner (e.g., via an interaction of the event planner with a user interface presented on the device of the event planner). For example, if the event is a wedding and the vendor is a disc jockey, the event module may receive a specification that the disc jockey is to set up disk jockeying equipment from 12 pm to 1 pm at the current location of the event planner within the venue. Thus, the event planner can walk around within the venue, activate a user interface on the device, and schedule particular or predetermined activities at particular locations for each of the vendors that the event planner has hired for the event. Such activities may include setting up equipment, providing services to attendees, tearing down equipment, and so on.

At operation 408, the event module may generate a notification for communicating to the vendor. The notification may include the specification of where and when the vendor is to set up things at the event. In various embodiments, the notification may be communicated to the vendor based on a detecting of a presence of the vendor at the venue. In various embodiments, the notification may include directions to direct that vendor from the vendor's current location within the venue to the location identified by the event planner as the location within the venue where the vendor is to perform an action.

Figure 5:
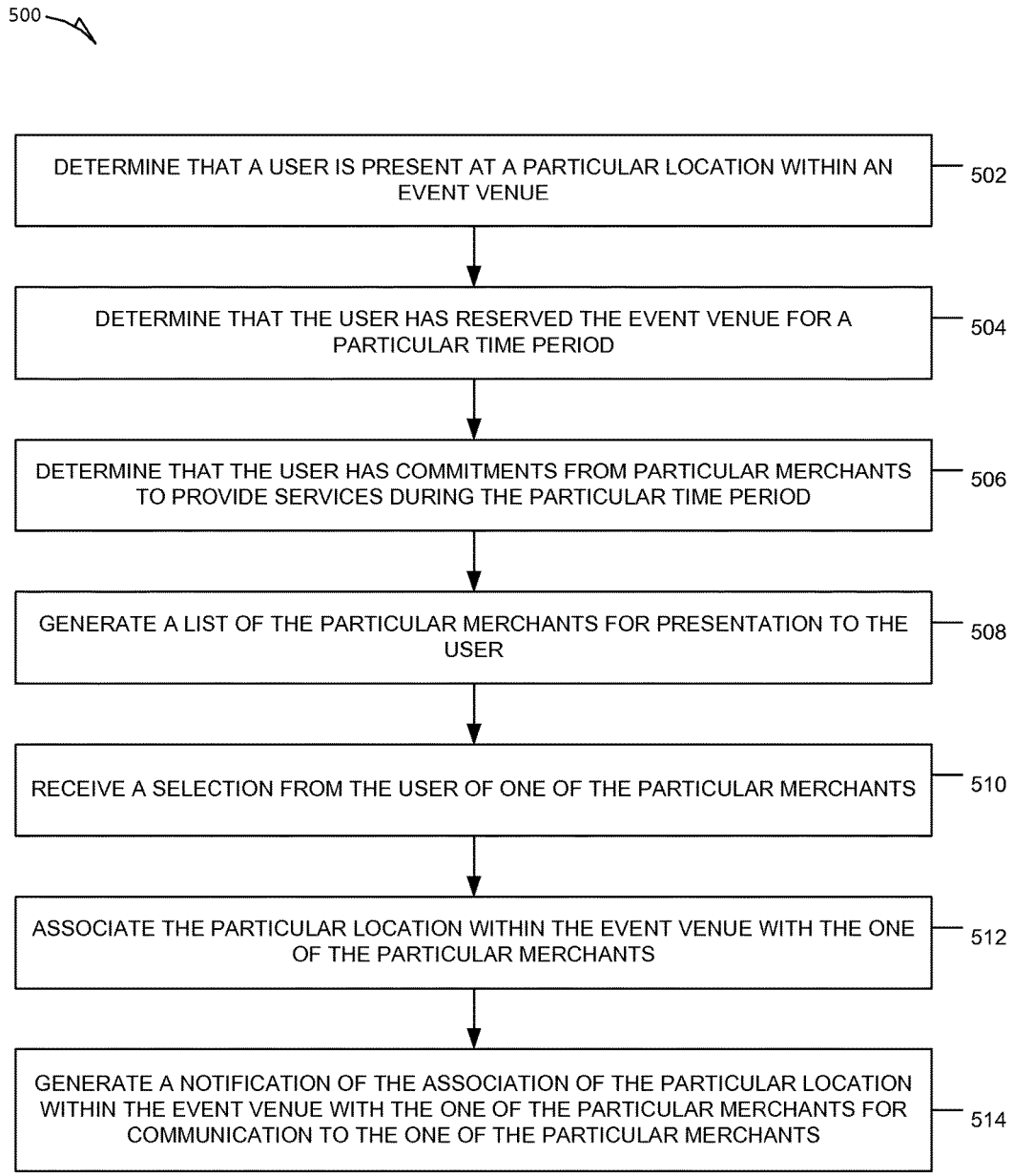
FIG. 5 is a flowchart illustrating example operations of a method 500 of associating event information with particular locations within an event venue.

FIG. 5 is a flowchart illustrating example operations of a method 500 of associating event information with particular locations within an event venue. In various embodiments, the method 400 may be performed by various modules of the event-planning application(s) 234.

At operation 502 the event-planning module may determine that a user is present at a particular location within an event venue. For example, the event-planning module may receive a communication from a device of the user that specifies GPS coordinates of the user. The event-planning module may then identify a particular location within the venue that corresponds to the GPS coordinates.

At operation 504, the event-planning module may determine that the user has reserved the event venue for a particular time period. For example, the event-planning module may communicate with a payment processing system (e.g., via the integration module) to request that the payment processing system provide information pertaining to payment records associated with transactions having the user and an operator of the venue as parties. The event-planning module may then identify the particular time period based on the information.

At operation 506, the event-planning module may determine that the user has commitments from particular or predetermined merchants or vendors to provide services during the particular time period at the event venue. For example, the event-planning module may communicate with a payment processing system (e.g., via the integration module) to request that the payment processing system provide information pertaining to payment records associated with transactions for services to be provided during the identified time period and for which the user and the merchants are parties.

At operation 508, the event-planning module may generate a list of the particular merchants for presentation to the user. For example, the event-planning module may generate the list for presentation in a user interface of a device of the user.

At operation 510, the event-planning module may receive a selection from the user of one of the particular merchants. For example, upon being presented with a list of the particular merchants in the user interface, the user may interact with the user interface to select one of the particular merchants. This selection of the user may then be communicated to the event-planning module.

At operation 512, the event-planning module may associate the particular location within the event venue with the selected merchant. The event-planning module may store this association, along with other data relevant to the association, for later access. Such other data may include activities that the merchant is to perform, times at which the merchant is to perform those activities, and so on.

At operation 514, the event-planning module may generate a notification of the association of the particular location within the event venue with the selected merchant. The event-planning module may communicate the notification for presentation to the selected merchant (e.g., based on a detecting of a presence of the selected merchant at the venue).

Thus, a user, such as an event organizer, may walk around to different locations of the event venue and mark the locations as being associated with particular vendors (e.g., such as vendors that the user has engaged in a contract with to provide services at the event). In various embodiments, the user may mark such associations by activating an element of a user interface being presented to the user on a mobile device of the user. Additionally, the user may specify activities that the vendor is to perform at the location at times at which the vendor is to perform those activities. The vendor may then be provided of a notification of the marked locations and associated information (e.g., based on an identification of a presence of the vendor at the location). In various embodiments, the notification may include directions directing the vendor from a first location within the venue (e.g., the vendor's current location) to the marked location.

Figure 6:
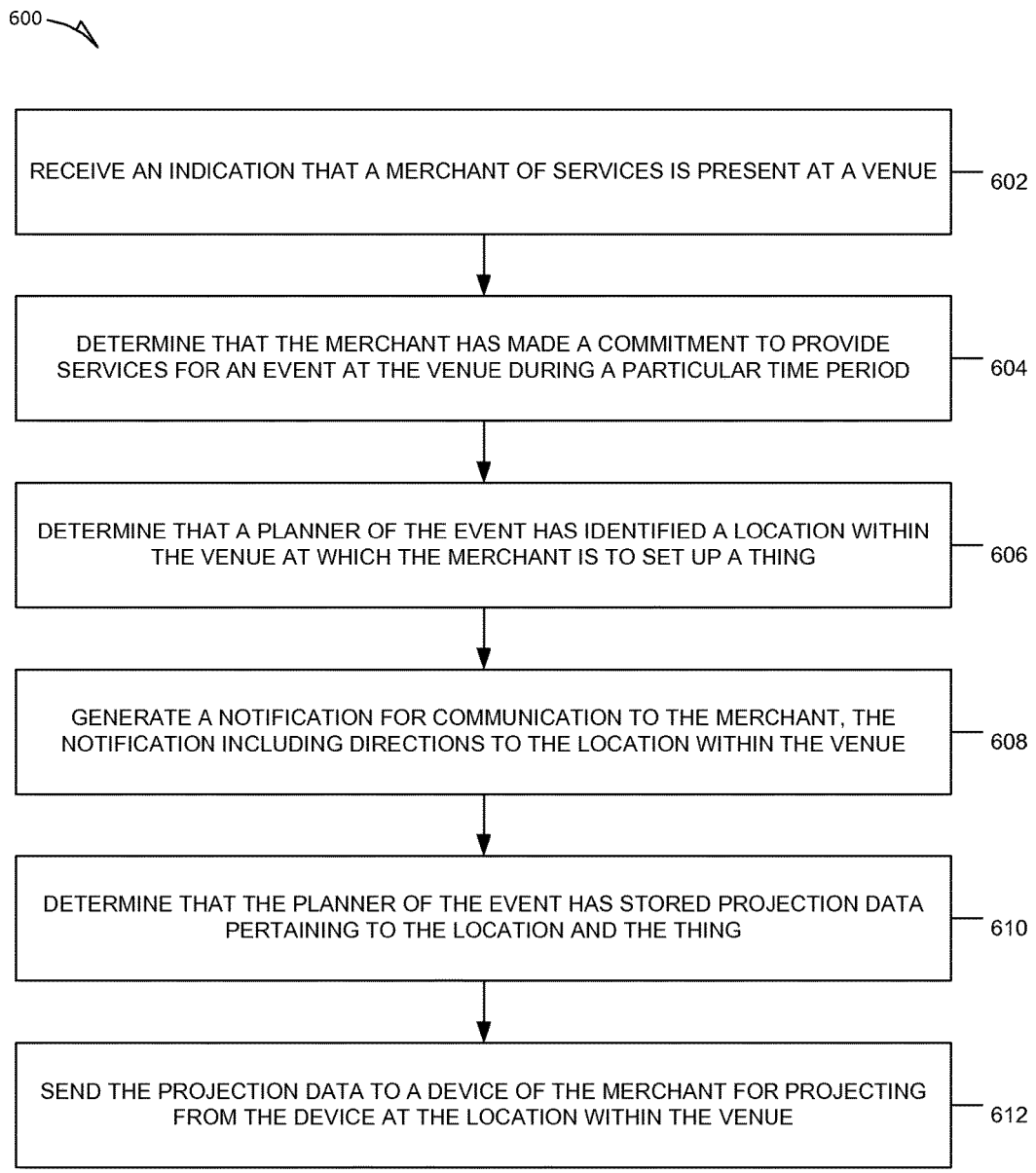
FIG. 6 is a flowchart illustrating example operations of a method 600 of notifying a vendor of information pertaining to the providing of services of the vendor at an event.

FIG. 6 is a flowchart illustrating example operations of a method 600 of notifying a vendor of information pertaining to the providing of services of the vendor at an event. In various embodiments, the method 400 may be performed by various modules of the event-planning application(s) 234.

At operation 602, the event-planning module may receive an indication that a merchant or vendor of services is present at a venue. For example, the event-planning module may receive a communication from a device of the vendor indicating the GPS coordinates of the vendor. The event-planning module may then identify that the GPS coordinates are within the venue.

At operation 604, the event-planning module may determine that the merchant has made a commitment to provide services for an event at the venue during a particular time period. For example, the event-planning module may communicate with a payment processing system (e.g., via the integration module) to request payment records associated with the merchant and the venue, such as payment records corresponding to a transaction between an event planner and the merchant to provide services at an event at the venue during the particular time period.

At operation 606, the event-planning module may determine that a planner of the event has identified a location within the venue at which the merchant is to set up a thing. For example, the event-planning module may retrieve information stored on behalf of the event planner. The information may specify actions that the merchant is scheduled to perform at particular times, such as when and where to set up things pertaining to services that vendor is to provide at the event.

At operation 608, the event-planning module may generate a notification for communication to the merchant. The notification may include directions from a current location of the merchant (as identified from GPS coordinates transmitted from a device of the merchant) to the location within the venue at which the merchant is to perform an action.

At operation 610, the event-planning module may determine that a planner of the event has stored projection data pertaining to the location and the thing. Such projection data may include a wireframe that may be projected from the device onto the ground or other surface at the location. The wireframe may provide an outline of the area in which the vendor is to set up a thing, such as a wedding cake, a floral arrangement, and so on.

At operation 612, the event-planning module may send the projection data to a device of the merchant for projection from the device. For example, upon receiving the projection data, an application executing on the device of the merchant may process the projection data and project a wireframe onto the ground or other surface to help the merchant visualize how the planner of the event wishes the merchant to set up items that are relevant to the services that the merchant is scheduled to provide at the event.

Thus, vendors may receive precise instructions pertaining to the times and locations within the venue at which the vendors are to set up equipment, provide services, and so on. For example, a caterer may receive instructions pertaining to the precise times and locations within the venue at which tables are to be set up, a florist may receive precise times and locations within the venue at which flower arrangements are to be placed, a baker may receive precise times and locations within the venue at which the wedding cake is to be placed, and so on. Additionally, wireframe projections may even indicate the orientation at which the vendor is to set up or place things within the venue with respect to vendor or surroundings at the location.

Figure 7:
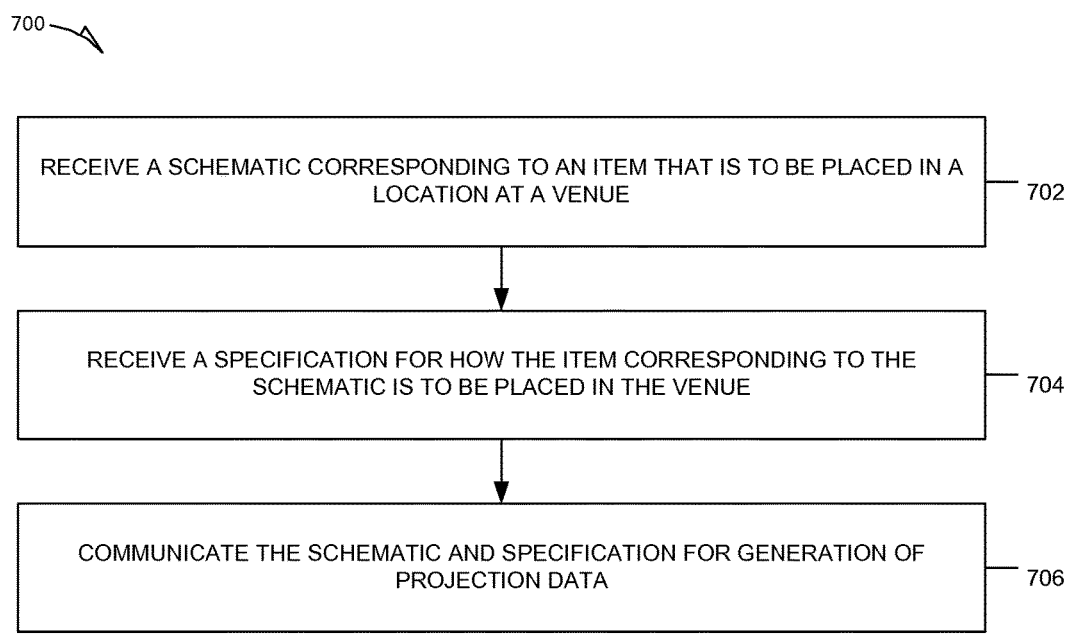
FIG. 7 is a flowchart illustrating example operations of a method 700 of generating projection data corresponding to items that are to be placed in a location at a venue.

FIG. 7 is a flowchart illustrating example operations of a method 700 of generating projection data corresponding to items that are to be placed in a location at a venue. In various embodiments, the method 400 may be performed by various modules of the client application(s) 112.

At operation 702, the projection module receives a schematic corresponding to an item that is to be placed in a location at a venue. In various embodiments, the schematic may be selected from a library of schematics (e.g., maintained by the event-planning module 358). In various embodiments, the schematics may be generated and provided by vendors of services responsible for the items during the providing of services at an event. For example, a baker may provide a schematic for a wedding cake, a disc jockey may provide schematics for speakers or other audio-visual equipment that the disc jockey will be using, a caterer may provide schematics for tables that the caterer will be setting up, and so on. The schematic may include the dimensions (e.g., height, size, width), visual appearance (e.g., color), requirements for position of the item relative to other items, and so on).

At operation 704, the projection module may receive a specification for how the item corresponding to the schematic is to be placed in the venue. For example, the projection module may cause the device to project an image corresponding to the schematic onto a surface (e.g., the ground) at the current location of the event planner. The projection module may enable the event planner to (via a user interface presented on the device) to simulate the placement of the item within the venue at a particular location and orientation. The projection module may then save the specification of the particular location and orientation based on an interaction of the event planner with the user interface.

At operation 706, the projection module may communicate the schematic and specification (e.g. to the event-planning module) for generation of projection data. The vendor may then access the projection data to determine the precise location and orientation of particular or predetermined items that the vendor is responsible for setting up within a particular location at the venue.

Certain embodiments are described herein as including logic or a number of components, modules, or mechanisms. Modules may constitute either software modules (e.g., code embodied on a machine-readable medium or in a transmission signal) or hardware modules. A hardware module is a tangible unit capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods described herein may be at least partially processor-implemented. For example, at least some of the operations of a method may be performed by one or more processors or processor-implemented modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The one or more processors may also operate to support performance of the relevant operations in a "cloud computing" environment or as a "software as a service" (SaaS). For example, at least some of the operations may be performed by a group of computers (as examples of machines including processors), these operations being accessible via a network (e.g., the network 104 of FIG. 1) and via one or more appropriate interfaces (e.g., APIs).

Example embodiments may be implemented in digital electronic circuitry, or in computer hardware, firmware, software, or in combinations of them. Example embodiments may be implemented using a computer program product, e.g., a computer program tangibly embodied in an information carrier, e.g., in a machine-readable medium for execution by, or to control the operation of, data processing apparatus, e.g., a programmable processor, a computer, or multiple computers.

A computer program can be written in any form of programming language, including compiled or interpreted languages, and it can be deployed in any form, including as a stand-alone program or as a module, subroutine, or other unit suitable for use in a computing environment. A computer program can be deployed to be executed on one computer or on multiple computers at one site or distributed across multiple sites and interconnected by a communication network.

In example embodiments, operations may be performed by one or more programmable processors executing a computer program to perform functions by operating on input data and generating output. Method operations can also be performed by, and apparatus of example embodiments may be implemented as, special purpose logic circuitry (e.g., a FPGA or an ASIC).

The computing system can include clients and servers. A client and server are generally remote from each other and typically interact through a communication network. The relationship of client and server arises by virtue of computer programs running on the respective computers and having a client-server relationship to each other. In embodiments deploying a programmable computing system, it will be appreciated that both hardware and software architectures require consideration. Specifically, it will be appreciated that the choice of whether to implement certain functionality in permanently configured hardware (e.g., an ASIC), in temporarily configured hardware (e.g., a combination of software and a programmable processor), or a combination of permanently and temporarily configured hardware may be a design choice. Below are set out hardware (e.g., machine) and software architectures that may be deployed, in various example embodiments.

Figure 8:
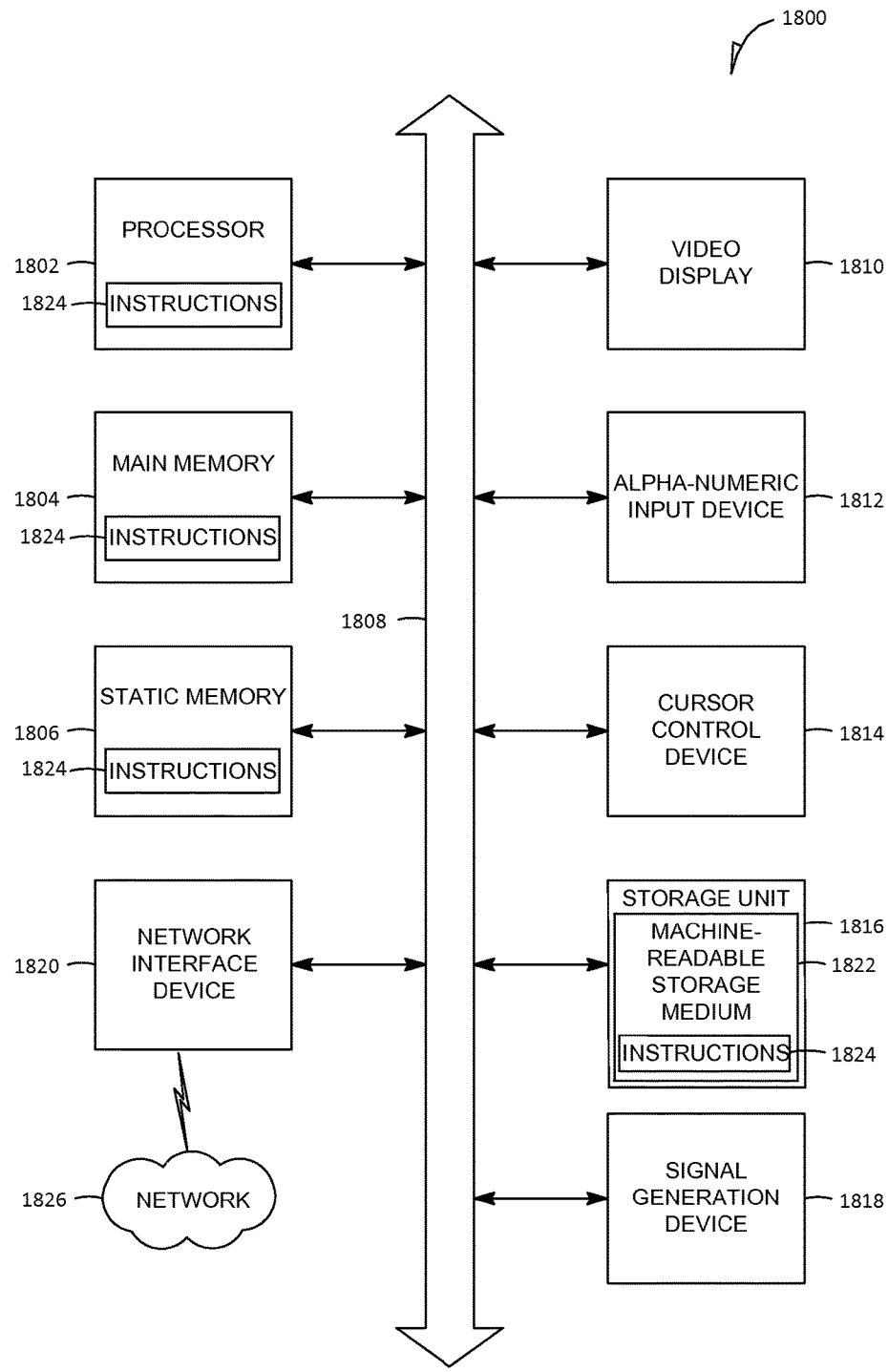
FIG. 8 is a block diagram of machine in the example form of a computer system within which instructions for causing the machine to perform any one or more of the methodologies discussed herein may be executed.

FIG. 8 is a block diagram of machine in the example form of a computer system 1800 within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1800 includes a processor 1802 (e.g., a central processing unit (CPU), a graphics processing unit (GPU) or both), a main memory 1804 and a static memory 1806, which communicate with each other via a bus 1808. The computer system 1800 may further include a video display unit 1810 (e.g., a liquid crystal display (LCD) or a cathode ray tube (CRT)). The computer system 1800 also includes an alphanumeric input device 1812 (e.g., a keyboard), a user interface (UI) navigation (or cursor control) device 1814 (e.g., a mouse), a storage unit 1816, a signal generation device 1818 (e.g., a speaker) and a network interface device 1820.

The storage unit 1816 includes a machine-readable medium 1822 on which is stored one or more sets of data structures and instructions 1824 (e.g., software) embodying or utilized by any one or more of the methodologies or functions described herein. The instructions 1824 may also reside, completely or at least partially, within the main memory 1804 and/or within the processor 1802 during execution thereof by the computer system 1800, the main memory 1804 and the processor 1802 also constituting machine-readable media. The instructions 1824 may also reside, completely or at least partially, within the static memory 1806.

While the machine-readable medium 1822 is shown in an example embodiment to be a single medium, the term "machine-readable medium" may include a single medium or multiple media (e.g., a centralized or distributed database, and/or associated caches and servers) that store the one or more instructions 1824 or data structures. The term "machine-readable medium" shall also be taken to include any tangible medium that is capable of storing, encoding or carrying instructions for execution by the machine and that cause the machine to perform any one or more of the methodologies of the present embodiments, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., Erasable Programmable Read-Only Memory (EPROM), Electrically Erasable Programmable Read-Only Memory (EEPROM), and flash memory devices; magnetic disks such as internal hard disks and removable disks; magneto-optical disks; and compact disc-read-only memory (CD-ROM) and digital versatile disc (or digital video disc) read-only memory (DVD-ROM) disks.

Accordingly, a "tangible machine-readable medium" may refer to a single storage apparatus or device, as well as "cloud-based" storage systems or storage networks that include multiple storage apparatus or devices. Furthermore, the tangible machine-readable medium is non-transitory in that it does not embody a propagating signal. However, labeling the tangible machine-readable medium as "non-transitory" should not be construed to mean that the medium is incapable of movement—the medium should be considered as being transportable from one physical location to another. Additionally, since the machine-readable medium is tangible, the medium may be considered to be a machine-readable device.

The instructions 1824 may further be transmitted or received over a communications network 1826 using a transmission medium. The instructions 1824 may be transmitted using the network interface device 1820 and any one of a number of well-known transfer protocols (e.g., HTTP). Examples of communication networks include a LAN, a WAN, the Internet, mobile telephone networks, POTS networks, and wireless data networks (e.g., WiFi and WiMax networks). The term "transmission medium" shall be taken to include any intangible medium capable of storing, encoding or carrying instructions for execution by the machine, and includes digital or analog communications signals or other intangible media to facilitate communication of such software. The network 1826 may be one of the networks 104.

Although an embodiment has been described with reference to specific example embodiments, it will be evident that various modifications and changes may be made to these embodiments without departing from the broader spirit and scope of the present disclosure. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

What is claimed is:

1. A method comprising:
 determining, using a networked system having one or more computer processors configured to perform operations for generating user interfaces for facilitating projecting of projection data onto a region within an event venue such that a merchant can visualize how a planner of an event wants the merchant to set up within the event venue, that the planner is present at a particular location within the event venue based on a communication received from a mobile device of the planner;

determining, using the networked system, that the planner has reserved the event venue for a particular time period;

receiving, using the networked system, a selection from the planner of a particular merchant that is committed to providing services at the event during the particular time period, the selection being received via a user interface presented on the mobile device of the planner;

storing, using the networked system, an association between the particular location within the event, the particular merchant, and projection data stored by the planner via the user interface presented on the mobile device of the planner;

based on a detection that the particular merchant is at the particular location, communicating, using the networked system, the projection data to the merchant and allowing the merchant to project the projection data onto the region via a user interface presented on a mobile device of the particular merchant.

2. The method of claim 1, wherein the determining that the planner has reserved the event venue for the particular time period is based on an analysis of transaction records maintained by a payment service via which the planner reserved the event venue.

3. The method of claim 1, further comprising determining that the particular merchant is committed to providing the services at the event during the particular time period based on an analysis of transaction records maintained by a payment service via which the merchant received payment for the services.

4. The method of claim 1, the operations further comprising providing directions to the merchant via the user interface presented on the mobile device of the particular merchant for moving from a current location to the particular location within the event venue.

5. The method of claim 1, the operations further comprising providing data items for projecting a wireframe corresponding to an item that is to be placed by the merchant at the particular location.

6. A system comprising:
one or more computer processors;
one or more computer memories;
a set of instructions incorporated into the one or more computer memories, the set of instructions configuring the one or more computer processors to perform operations for generating user interfaces for facilitating projecting of projection data onto a region within an event venue such that a merchant can visualize how a planner of an event wants the merchant to set up within the event venue, the operations comprising:
determining that the planner is present at a particular location within the event venue based on a communication received from a mobile device of the planner;
determining that the planner has reserved the event venue for a particular time period;
receiving a selection from the planner of a particular merchant that is committed to providing services at the event during the particular time period, the selection being received via a user interface presented on the mobile device of the planner;
storing an association between the particular location within the event, the particular merchant, and projection data stored by the planner via the user interface presented on the mobile device of the planner;
based on a detection that the particular merchant is at the particular location, communicating the projection data to the merchant and allowing the merchant to project the projection data onto the region via a user interface presented on a mobile device of the particular merchant.

7. The system of claim 6, wherein the determining that the planner has reserved the event venue for the particular time period is based on an analysis of transaction records maintained by a payment service via which the planner reserved the event venue.

8. The system of claim 6, wherein the one or more modules are further configured to determine that the particular merchant is committed to providing the services at the event during the particular time period based on an analysis of transaction records maintained by a payment service via which the merchant received payment for the services.

9. The system of claim 6, the operations further comprising providing directions to the merchant via the user interface presented on the mobile device of the particular merchant for moving from a current location to the particular location within the event venue.

10. The system of claim 6, the operations further comprising providing data items for projecting a wireframe corresponding to an item that is to be placed by the merchant at the particular location.

11. A non-transitory machine readable medium embodying a set of instructions that, when executed by a processor, causes the processor to perform operations for generating user interfaces for facilitating projecting of projection data onto a region within an event venue such that a merchant can visualize how a planner of an event wants the merchant to set up within the event venue, the operations comprising:
determining that the planner is present at a particular location within the event venue based on a communication received from a mobile device of the planner;
determining that the planner has reserved the event venue for a particular time period;
receiving a selection from the planner of a particular merchant that is committed to providing services at the event during the particular time period, the selection being received via a user interface presented on the mobile device of the planner;
storing an association between the particular location within the event, the particular merchant, and projection data stored by the planner via the user interface presented on the mobile device of the planner;
based on a detection that the particular merchant is at the particular location, communicating the projection data to the merchant and allowing the merchant to project the projection data onto the region via a user interface presented on a mobile device of the particular merchant.

12. The non-transitory machine readable medium of claim 11, wherein the determining that the planner has reserved the event venue for the particular time period is based on an analysis of transaction records maintained by a payment service via which the planner reserved the event venue.

13. The non-transitory machine readable medium of claim 11, further comprising determining that the particular merchant is committed to providing the services at the event during the particular time period based on an analysis of transaction records maintained by a payment service via which the merchant received payment for the services.

14. The non-transitory machine readable medium of claim 11, the operations further comprising providing directions to the merchant via the user interface presented on the mobile device of the particular merchant for moving from a current location to the particular location within the event venue.

15. The non-transitory machine readable medium of claim 11, the operations further comprising providing data items for projecting a wireframe corresponding to an item that is to be placed by the merchant at the particular location.

\* \* \* \* \*